(12) United States Patent
Gao et al.

(10) Patent No.: US 11,765,691 B2
(45) Date of Patent: Sep. 19, 2023

(54) SIGNALING OF QUASI-CO-LOCATION INFORMATION IN WIRELESS SYSTEMS

(71) Applicant: ZTE Corporation, Guangdong (CN)

(72) Inventors: Bo Gao, Guangdong (CN); Zhaohua Lu, Guangdong (CN); Yu Ngok Li, Guangdong (CN); Yijian Chen, Guangdong (CN); Chuangxin Jiang, Guangdong (CN); Hao Wu, Guangdong (CN)

(73) Assignee: ZTE Corporation, Guangdong (CN)

( * ) Notice: Subject to any disclaimer, the term of this patent is extended or adjusted under 35 U.S.C. 154(b) by 209 days.

(21) Appl. No.: 17/372,937

(22) Filed: Jul. 12, 2021

(65) Prior Publication Data

US 2021/0345299 A1     Nov. 4, 2021

Related U.S. Application Data

(63) Continuation of application No. PCT/CN2019/071151, filed on Jan. 10, 2019.

(51) Int. Cl.
*H04W 72/04* (2023.01)
*H04W 72/02* (2009.01)
(Continued)

(52) U.S. Cl.
CPC .......... *H04W 72/02* (2013.01); *H04W 16/28* (2013.01); *H04W 72/046* (2013.01); *H04W 80/02* (2013.01)

(58) Field of Classification Search
CPC ... H04W 72/02; H04W 16/28; H04W 72/046; H04W 80/02
See application file for complete search history.

(56) References Cited

U.S. PATENT DOCUMENTS 11,172,513 B2 * 11/2021 Zhou ................. H04W 74/0833
2018/0063828 A1    3/2018 Wang et al.
(Continued)

FOREIGN PATENT DOCUMENTS

| CN | 108024344 A | 5/2018 |
| CN | 108702182 A | 10/2018 |

(Continued)

OTHER PUBLICATIONS

Nokia et al., "On DL Signals and Channels for NR-U," 3GPP TSG RAN WG1 Meeting # 95, Spokane, USA, R1-1812696, 21 pages, Nov. 12-16, 2018.

(Continued)

*Primary Examiner* — Fahmida S Chowdhury
(74) *Attorney, Agent, or Firm* — Perkins Coie LLP

(57) ABSTRACT

Methods, systems, and devices for signaling quasi-co-location information in mobile communication technology are described. An exemplary method for wireless communication includes transmitting, from a first communication node and to a second communication node, a signal according to a beam set that comprises a first subset of B beams selected from a pool of beams, wherein B is positive integer. In an example, a beam of the beam set comprises one or more channel property assumptions, one or more reference signals (RSs), one or more RS sets, one or more spatial relation states, one or more quasi-co-location (QCL) states, one or more transmission configuration indicator (TCI) state, one or more spatial domain filters or one or more pre-coding filters.

25 Claims, 8 Drawing Sheets

(51) Int. Cl.
*H04W 16/28* (2009.01)
*H04W 72/044* (2023.01)
*H04W 80/02* (2009.01)

(56) References Cited

U.S. PATENT DOCUMENTS

| | | | |
|---|---|---|---|
| 2018/0302889 A1* | 10/2018 | Guo | H04L 5/0085 |
| 2018/0343653 A1* | 11/2018 | Guo | H04W 72/542 |
| 2019/0116605 A1* | 4/2019 | Luo | H04W 72/0446 |
| 2019/0132828 A1* | 5/2019 | Kundargi | H04B 17/318 |
| 2019/0141693 A1* | 5/2019 | Guo | H04W 16/14 |
| 2019/0222289 A1* | 7/2019 | John Wilson | H04W 72/046 |
| 2020/0280409 A1* | 9/2020 | Grant | H04B 7/0617 |
| 2020/0358582 A1* | 11/2020 | Takeda | H04B 7/0695 |
| 2020/0373992 A1* | 11/2020 | Wang | H04B 7/088 |
| 2021/0391912 A1* | 12/2021 | Hakola | H04B 7/0408 |

FOREIGN PATENT DOCUMENTS

| | | |
|---|---|---|
| EP | 3 537 798 A1 | 9/2019 |
| WO | 2017/171867 A1 | 10/2017 |
| WO | 2017/194094 A1 | 11/2017 |

OTHER PUBLICATIONS

EPO, European Search Report for European Patent Application No. 19849515.2, dated Jul. 20, 2022, 11 pages.

International Search Report and Written Opinion dated Oct. 8, 2019 for International Application No. PCT/2019/071151, filed on Jan. 10, 2019 (7 pages).

IPI, First Examination Report for Indian Application No. 202147032425, dated Jan. 23, 2023, 6 pages.

* cited by examiner

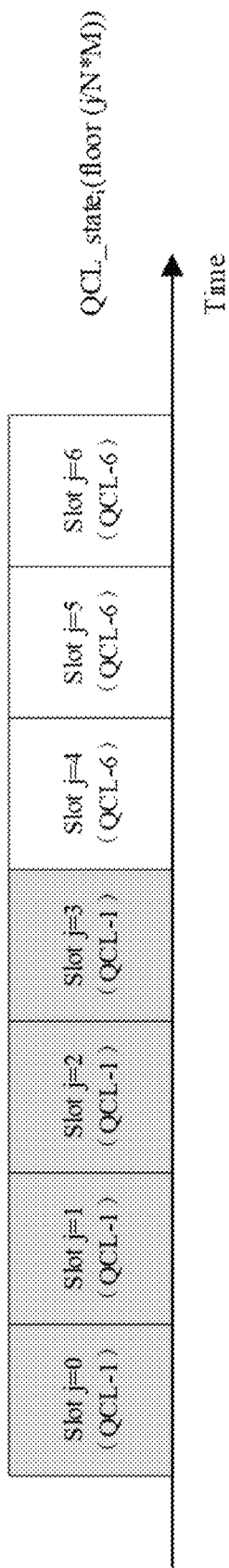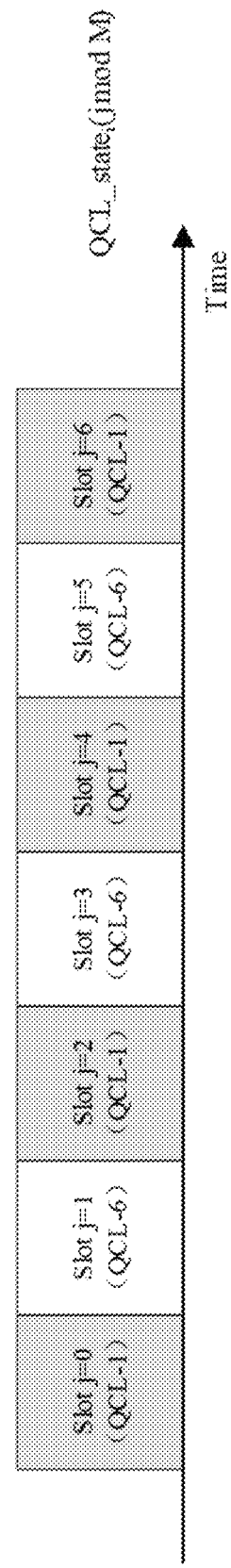
FIG. 5A
FIG. 5B

SIGNALING OF QUASI-CO-LOCATION INFORMATION IN WIRELESS SYSTEMS

CROSS-REFERENCE TO RELATED APPLICATIONS

This application is a continuation of International Patent Application No. PCT/CN2019/071151, filed on Jan. 10, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement efficient methods and implementations of signaling quasi-co-location information.

SUMMARY

This document relates to methods, systems, and devices for generating sequences for reference signals in mobile communication technology, including 5th Generation (5G) and New Radio (NR) communication systems.

In one exemplary aspect, a wireless communication method is disclosed. The method includes transmitting, from a first communication node and to a second communication node, a signal according to a beam set that comprises a first subset of B beams selected from a pool of beams, wherein M is positive integer.

In another exemplary aspect, a wireless communication method is disclosed. The method includes receiving, by a first communication node and from a second communication node, a signal according to a beam set that comprises a first subset of B beams selected from a pool of beams, wherein M is positive integer.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 5A and 5B show examples of pattern indications for downlink (DL) quasi-co-location (QCL) states of one PDSCH transmission.

DETAILED DESCRIPTION

As the use of wide and ultra-wide spectrum resources increase, the considerable propagation loss induced by the extremely high frequency becomes a noticeable challenge. To mitigate this issue, antenna array and beam-forming training technologies using massive MIMO, e.g., up to 1024 antenna element for one node, have been adopted to achieve beam alignment and obtain sufficiently high antenna gain. To ensure a low implementation cost while still benefiting from the advantages provided by an antenna array, analog phase shifters have become very attractive for implementing mmWave beam-forming, wherein the number of phases is finite and constant modulus constraints are placed on the antenna elements. Given the pre-specified beam patterns, variable-phase-shift-based beamforming training attempts to identify the best pattern for subsequent data transmission, e.g., in the one transmission point (TRP) and one-panel cases.

Figure 1:
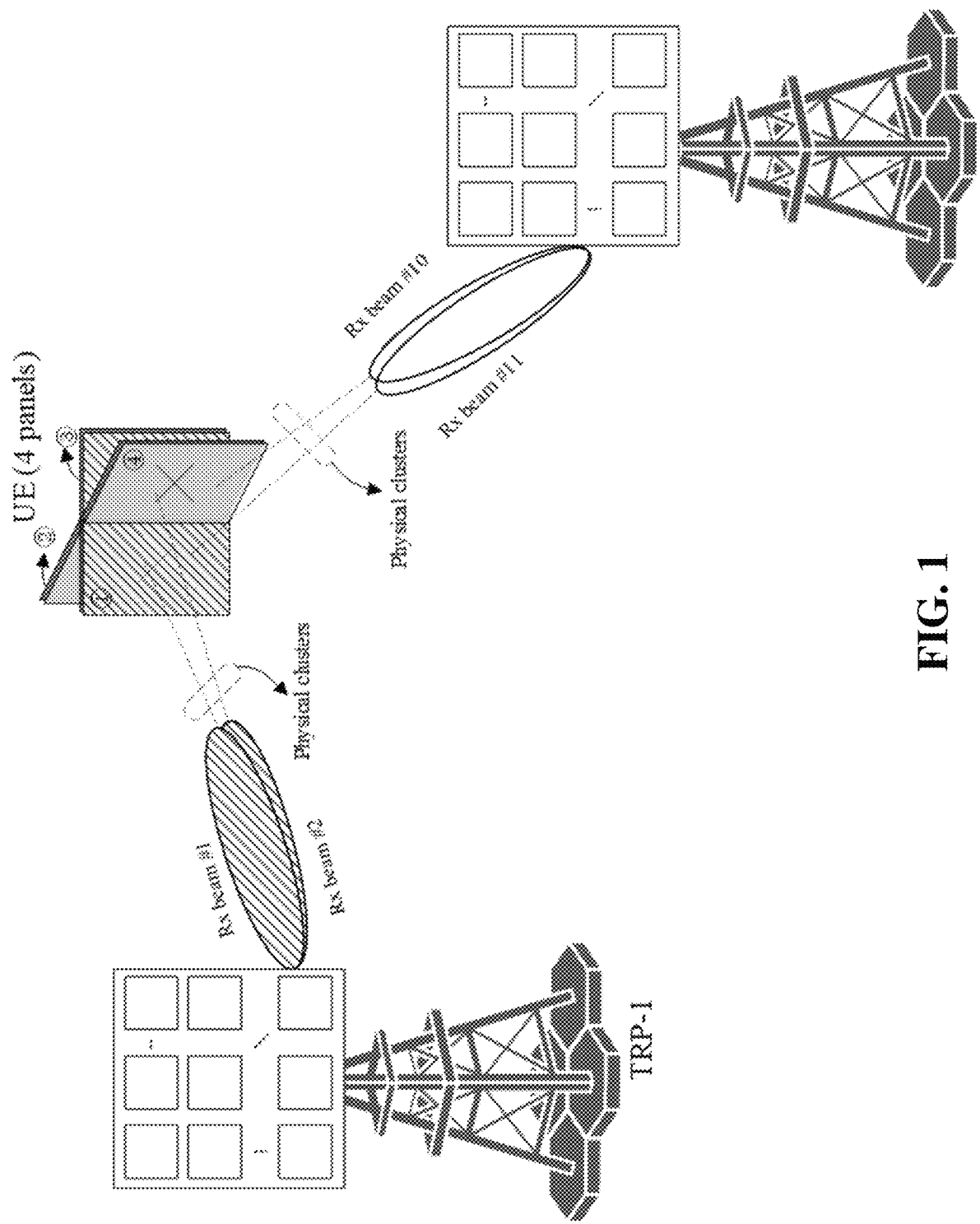
FIG. 1 is an example of a beam management framework for the multi-panel and multi-TRP (transmission point) case.

Multi-TRP and multi-panel cases should be considered for beyond 5G gNB (base station) and the next-generation communications, wherein there are multiple panels for UE in order to cover whole space for enhancing coverage. In an example, one panel for a TRP and UE may have two TXRUs, which are associated with cross polarization. Thus, in order to achieve a high rank or multi-layer transmissions, the TRP and UE should try to use different beams generated from different panels with objective of sufficiently using capability of each panel, including its associated TXRUs. FIG. 1 shows an example of beam measurement and reporting wherein the UE has four side panels.

Furthermore, in 5G NR, analog beam-forming was primarily introduced into mobile communication for guaranteeing the robustness of high frequency communications. In order to guarantee performance, especially for supporting ultra-reliable & low latency communications (URLLC), one channel transmission should be performed using more than one Tx-Rx beam pair. In some embodiments, the following issues should be considered:

For downlink (DL) and uplink (UL) channel transmission, the signaling of associating more than one Tx beam should be back-forward compatible for the current architecture of indicating one Tx beam and flexible for combining any candidate pair, e.g., for channel tracking.

Beams may be transmitted simultaneously or transmitted separately in different time units, like time-division multiplexing (TDM), which depends on the capability of the UE to support simultaneous transmission and the base station (e.g., gNB, eNB) configuration. For non-simultaneous transmissions, the time pattern for one set of M Tx beams for UL/DL transmissions should be considered with N time-unit aggregation, where M and N are positive integers.

Default beam determination for data channel or radio link monitoring should be considered for the cases when the control channel is associated with more than one beam.

Figure 2:
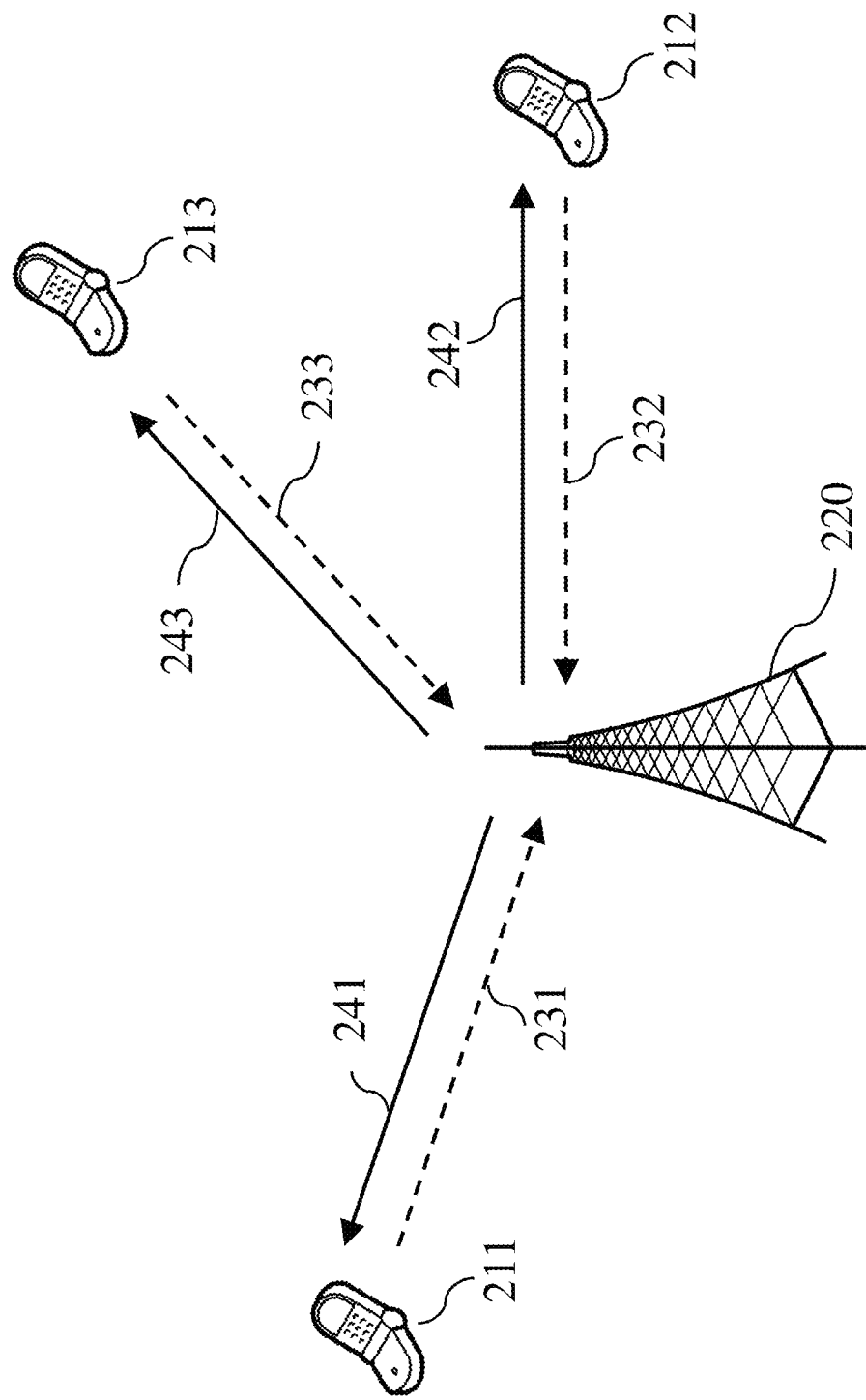
FIG. 2 shows an example of a base station (BS) and user equipment (UE) in wireless communication, in accordance with some embodiments of the presently disclosed technology.

FIG. 2 shows an example of a wireless communication system (e.g., an LTE, 5G or New Radio (NR) cellular network) that includes a BS 120 and one or more user equipment (UE) 111, 112 and 113. In some embodiments, the BS 220 transmits an indication of a mapping (241, 242, 243) to the UEs, which is followed by subsequent communications (231, 232, 233) that use the specified associations. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Nomenclature for Embodiments of the Disclosed Technology

In the drawings, the descriptions, and the claims of this document the following terminology is adopted. In some embodiments, a "beam" may be interpreted as channel property assumption, quasi-co-location (QCL) state, transmission configuration indicator (TCI) state, spatial relation state (also called as spatial relation information state), a reference signal (RS), a RS set, a spatial filter or a precoding matrix. For example, A "Tx beam" may be a channel property assumption, QCL state, RS set, TCI state, spatial relation state, DL/UL reference signal (such as a channel state information reference signal (CSI-RS), synchronization signal block (SSB) (which is also called as SS/PBCH), demodulation reference signal (DMRS), sounding reference signal (SRS)), a Tx spatial filter or a Tx precoding matrix.

An "Rx beam" may be a channel property assumption, QCL state, RS set, TCI state, spatial relation state, spatial filter, an Rx spatial filter or Rx precoding.

A "beam ID" may be interpreted as a channel property assumption index, QCL state index, RS set, TCI state index, spatial relation state index, reference signalling index, a spatial filter index or a precoding index.

In some embodiments, the spatial filter may be either a UE-side filter or a gNB-side filter, and may also be referred to as a spatial-domain filter.

In some embodiments, "spatial relation information" is comprised of one or more reference RSs, which is used to represent "spatial relation" between targeted "RS or channel" and the one or more reference RSs, where "spatial relation" means the same/quasi-co beam, same spatial parameter, quasi-co spatial domain filter, or the same spatial domain filter.

In some embodiments, a "quasi-co-location (QCL) state" or "RS set" may include one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] spatial parameter. In some further embodiments, "QCL state" may be interpreted as "TCI state".

In some embodiments, link recovery is equivalent to beam recovery.

In some embodiments, "time unit" can be sub-symbol, symbol, slot, sub-frame, frame, or transmission occasion.

In some embodiment, "search space" can be search space set.

Exemplary Embodiments for Signaling Quasi-Co-Location (QCL) Information

Embodiment 1: Signaling for Combining Multiple Beams for One or More Transmissions In some embodiments, and for combining multiple beams (e.g., QCL states, transmission configuration indicator (TCI) states, spatial relation states or spatial relation information (SRI)) for one or more transmissions (e.g., PDSCH, PDCCH, PUSCH or PUCCH) as one beam set, at least one of the following mechanism should be used:

Option 1.

Figure 3:
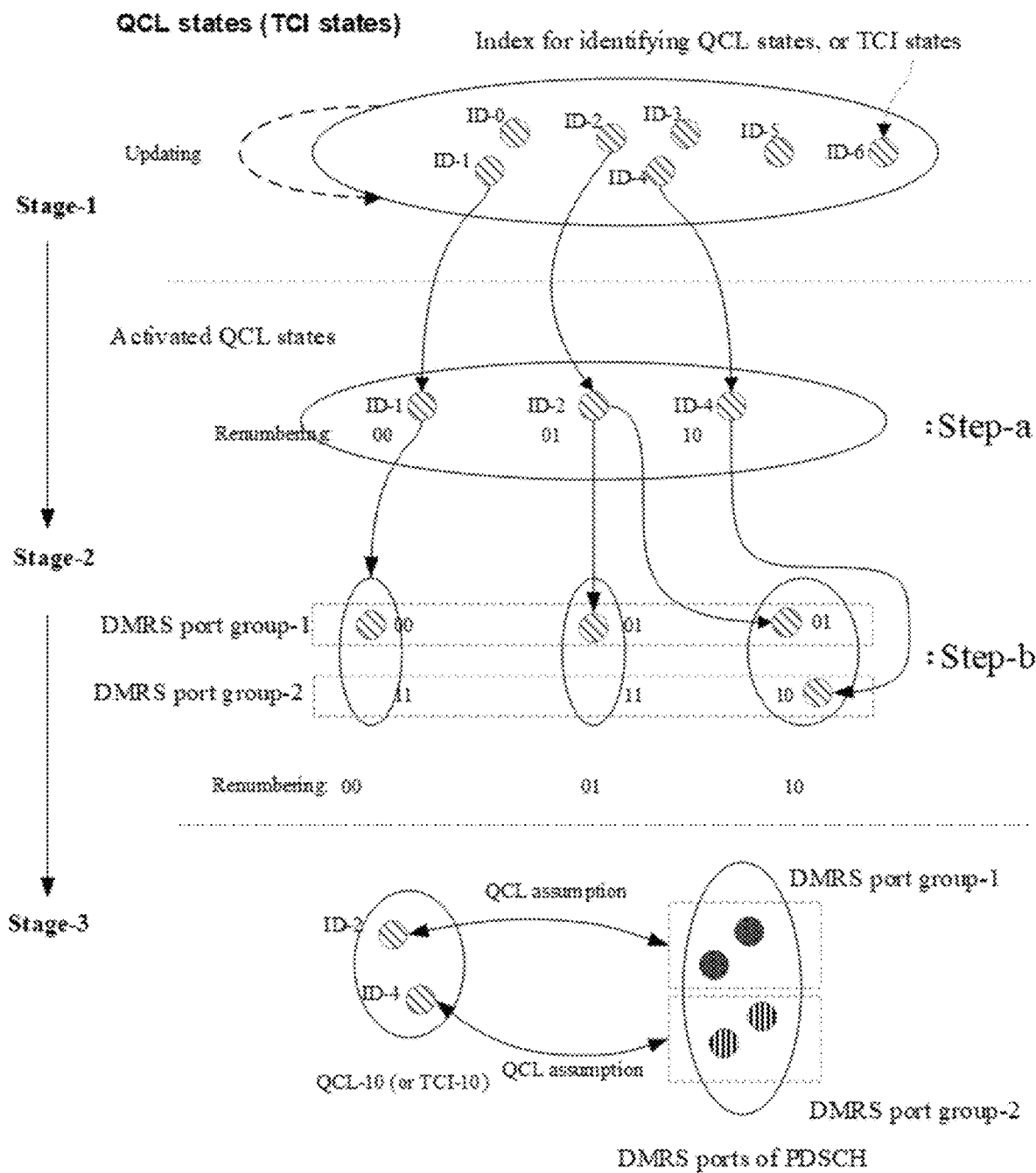
FIG. 3 shows an exemplary framework of multi-level beam indication for physical downlink shared channel (PDSCH) in the multi-panel and multi-TRP case.

As shown in FIG. 3, a bitmap may be used to activate N beams from one candidate pool (Step-a), and then the one or more beams may be combined to form a beam set (Step-b). In an example, the candidate beam pool can be RRC configured, or generated according to one or multiple RS set, e.g., SRS resource set. In another example, the QCL assumption for CSI-RS for tracking is determined according to the N beams, when the beam is TCI state or QCL state. In yet another example, Step-a and Step-b can be carried by one MAC-CE command, where one bit in the MAC-CE command is used to indicate whether the field associated with Step-b exists. In yet another example, Step-a and Step-b can be carried by two separate MAC-CE commands, but the MAC-CE command of Step-b is based on the beams activated by MAC-CE command of Step-a. In yet another example, at least one codepoint in step-b is reserved not to be associated with any of N beams, which is to be used for non-combining any further beam case.

Option 2.

A bitmap may be used to activate N beams from one candidate pool (Step-a), and then one or more explicit ID can be provided from the candidate RRC pool to be associated with each of the N beams (Step-b). In an example, one of the N beams and its associated one or more beam to be indicated by explicit ID is interpreted as one beam set. In another example, Step-a and Step-b can be carried by one MAC-CE command, where one bit in the MAC-CE command is used to indicate whether the field associated with Step-b exists. In yet another example, Step-a and Step-b are carried by two separate MAC-CE commands, but the MAC-CE command of Step-b is based on the beams activated by MAC-CE command of Step-a.

Option 3.

Combining multiple beams through using explicit ID as one beam set.

Option 4.

Multiple (e.g., M) bitmaps may be used, each of which activates Ni beams from one or multiple candidate beam pools, where i=0, 1, 2, . . . , M−1 (Step-a), and then providing one combination of one or more IDs for one set (Step-b). In an example, in Step-b, the one or more IDs can be selected from separate beam pools generated by the M bitmaps, respectively. In another example, in Step-b, the one or more IDs can be selected from any beam pools generated by the M bitmaps.

In some embodiments, and for a PDSCH transmission, the following three-step process for the QCL indication shown in FIG. 3 may be been summarized as follows:

Step-1: Multiple QCL states (or called as TCI states) are configured or re-configured by RRC signaling.

Step-2: Activate or de-activate QCL states and combing one or more of the activate QCL states as one set for one DCI codepoint through Step-a and Step-b, respectively.

Step-a: Activate or de-activate QCL states through one bitmap

Step-b: Combining the already activated QCL states in Step-a into one set, where, as shown in FIG. 3, one codepoint '11' is reserved not to associated with any of N beams, which is to be used for non-combining any further beam case. In an example, and for the case of indicating one of QCL-00 and QCL-01 after Step-b, the DMRS port group 2 can NOT be used.

Step-3: Indicate one QCL state ID, which has been re-numbered after Step-b in Stage-2, for assisting of PDSCH demodulation.

Embodiment 2: Beam Pattern Indication for DL and UL Signals

In some embodiments, for combining multiple beams (also called as QCL states, TCI states, spatial relation states or SRIs) for one or more transmission, the one or more transmission has at least one or more of the following features:

Feature 1.

The multiple beams are transmitted simultaneously.

In some embodiments, one data channel (e.g., PDSCH, or PUSCH) includes more than one port group, and consequently, one port group is respectively associated with one Tx beam (e.g., QCL state, or TCI state). From the perspective of one data channel transmission, more than one Tx beams are transmitted simultaneously.

Feature 2.

Each beam from one set of multiple beams are transmitted in an ordered manner for one transmission, which includes at least one of a control resource set (CORESET), a PDSCH, a PUSCH, a semi-persistent scheduled (SPS)-PUSCH, a PUCCH, a semi-persistent (SP) or a periodic PUCCH.

In some embodiments, one set of multiple beams and their corresponding time-domain patterns are configured for one transmission. Once the one transmission is initialized, the beam of the respective time domain units is determined in the aforementioned ordered manner.

In some embodiments, the set {Tx beam-1, Tx beam-2} is configured for one 2-slot aggregate transmission (e.g., PDSCH, PUSCH and PUCCH). In such a case, Tx beam-1 is used for the first slot transmission, and Tx beam-2 is used for the second slot transmission.

Feature 3.

The beam to be used for one transmission (e.g., PDSCH, or PUSCH) or one transmission in one given time unit is determined (or selected) from one set according to the PDCCH or CORESET scheduling the one transmission, the given time unit of the one transmission, index of the one transmission occasion, or DMRS port group index.

In some embodiments, one or more slots for the one transmission are grouped into R sets, where R is positive integer, and each of the R sets is separately associated with one index of beam in the beam set.

Figure 4:
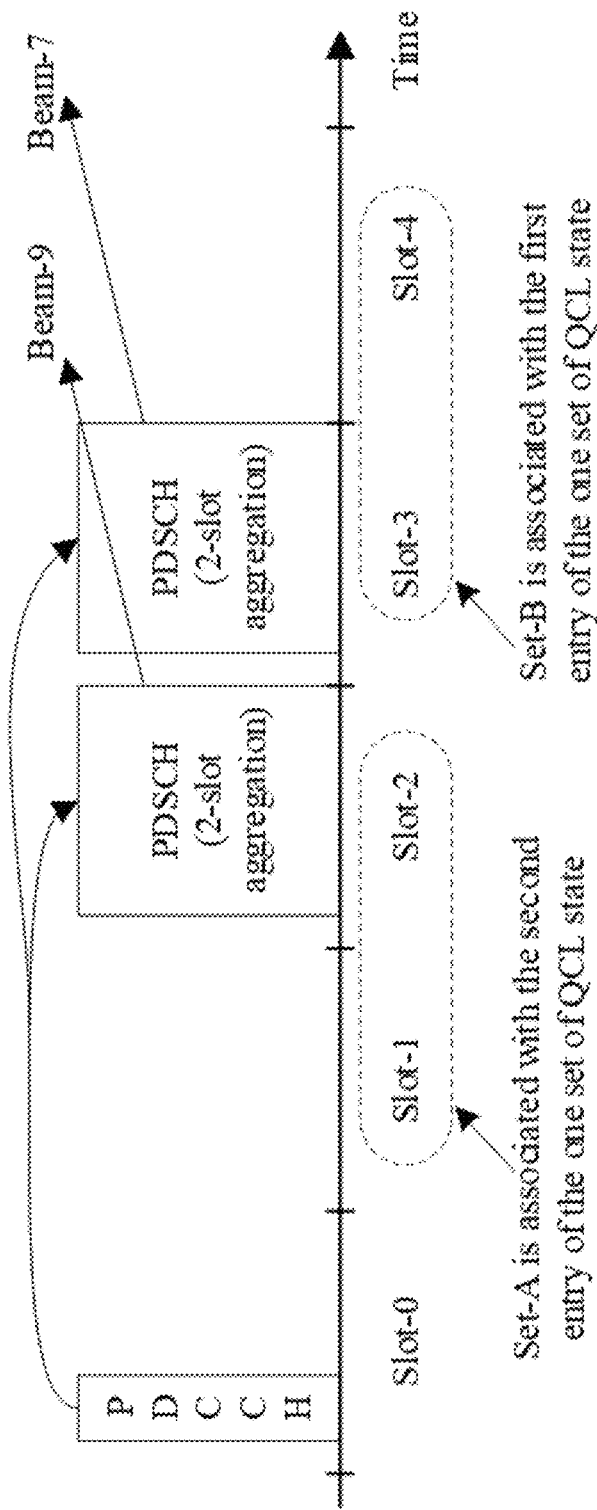
FIG. 4 shows an example of beam determination of a multi-slot PDSCH transmission.

In some embodiments, and as shown in FIG. 4, slot-0 and slot-1 are grouped into one Set-A and slot-2 and slot-3 are grouped into one Set-B, where Set-A and Set-B are associated with the second entry and first entry of beam set, respectively. When one channel is scheduled with one beam set {Beam-7, Beam-9} and transmitted in slot-1 and slot-2, the channel in slot-1 is transmitted through using Beam-9 and the one in slot-2 is transmitted through using Beam-7.

In some embodiments, when N time units or transmission occasions are associated with one set of M beams, where N and M are positive integers, the beam (e.g., QCL state, TCI state, spatial relation state or SRI) of time-unit or transmission occasion index j is determined according to {N, M and j} or {M and j}. Further j=0 is the first time unit or transmission occasion to be scheduled, or the first time unit or transmission occasion after or from one given time, which is determined by resource assignment information for the transmission.

In an example, and in the context of FIG. 5A, beam index $x(j)=QCL\_State_i$ (floor (j/N*M)), where $QCL\_state_i$ denotes the set of QCL state to be indicated or configured. As shown therein, one QCL pattern using the formula is indicated for one PDSCH transmission i, where the $QCL\_state_i$ to be indicated is {QCL-1, QCL-6}.

In another example, and in the context of FIG. 5B, beam index $x(j)=QCL\_State_i$ (j mod M)), where $QCL\_state_i$ denotes the set of QCL state to be indicated or configured. As shown therein, one QCL pattern using the formula is indicated for one PDSCH transmission i, where the $QCL\_state_i$ to be indicated is {QCL-1, QCL-6}. Furthermore, one QCL state can be associated with one or more respective MCSs, which is to keep the performance under one given transmission beam.

Embodiment 3: Beam Determination for DL Control Channel and Link Monitoring

In some embodiments, and in order to guarantee the robustness of the control channel or its corresponding data channel, multiple QCL states (e.g., beams or TCI states) can be configured and/or combined for one CORESET, which is based on MAC-CE signaling.

In some embodiments, the time domain pattern of one CORESET, which is monitored by one UE, is determined according to the search space set associated with the CORESET, taking into account that no time-domain information or parameters are explicitly configured for the CORESET.

In some embodiments, and from the perspective of UE, at least one of the following rules about associating the multiple QCL states with time unit, or occasion of monitoring PDCCH in the CORESET should be used:

The multiple QCL states are associated with the respective time unit or occasion of monitoring PDCCH in an ordered manner. In an example, the occasion of monitoring PDCCH is determined according to one monitored search space set associated with the CORESET.

One search space set can be associated with at least one beam from the multiple beams. In an example, multiple search space sets can be grouped into N groups of search space set, each of which is associated with the at least one beam from the multiple beams.

In some embodiments, and for the procedure of link recovery or radio link monitoring, at least one of the following aspects should be supported:

The radio link quality according to DL RSs associated with the entry with the highest or lowest ID or primary entry of the set of multiple beams should be measured.

The radio link quality according to DL RSs associated with all entries of the set of multiple beams should be accessed. For example, if there are two or more RS indexes in the one QCL state, the RS with QCL-Type-D, e.g., spatial parameter, is used for accessing radio link quality.

When the maximum number of QCL states or DL RSs to be monitored is T (e.g., according to UE capability or predefined threshold), radio link quality is accessed according to the QCL state with higher priority. The following examples are considered:

In an example, the number QCL states are determined according to all CORESETs within the cell or BWP.

In another example, and on a per CORESET basis, only one QCL state with lowest or highest ID, which can be local ID in the CORESET or ID in the candidate pool for CORESET configuration, is selected.

In yet another example, the CORESET with a lower or a higher ID has higher priority.

In yet another example, the CORESET with the shorter periodicity of its associated searching space set has higher priority.

Figure 6:
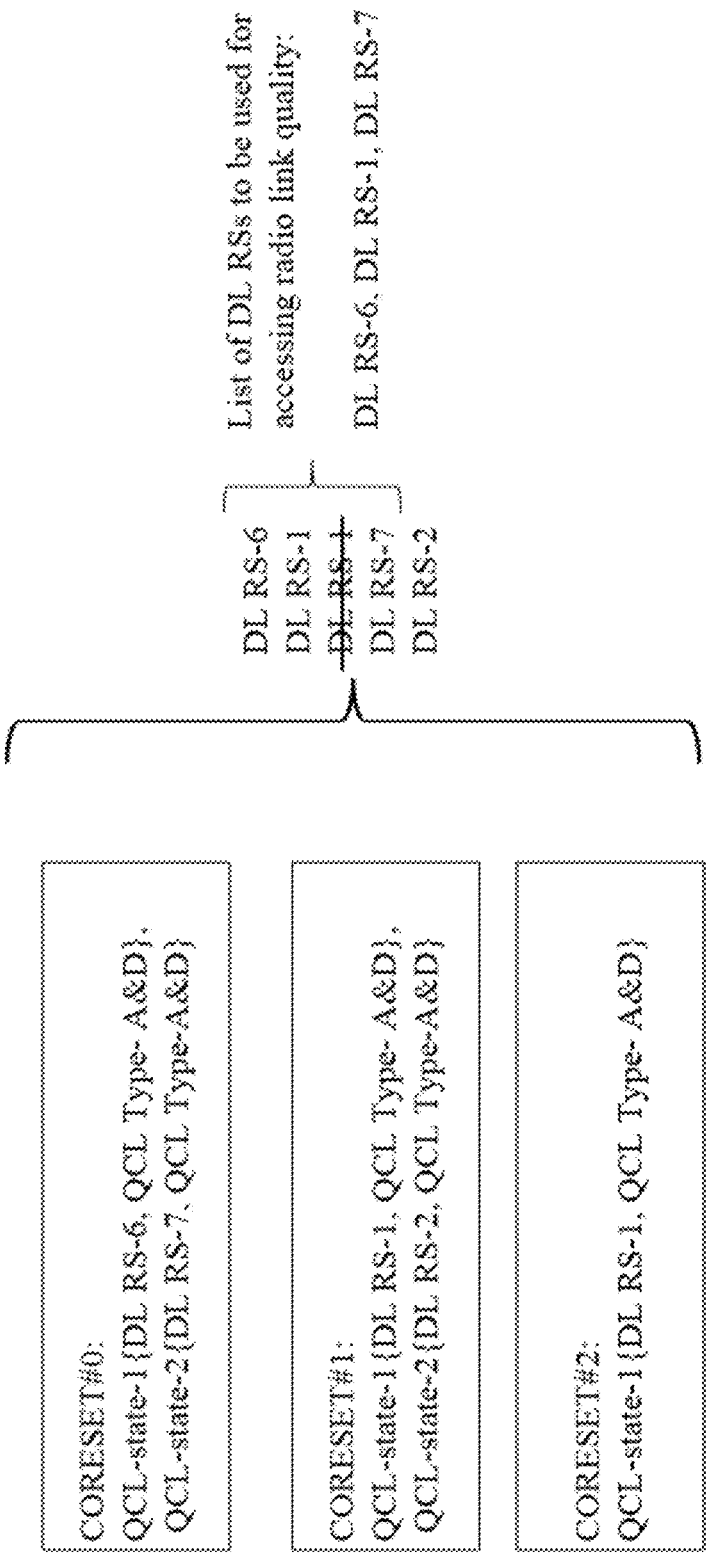
FIG. 6 shows an example of the determination of DL reference signals for accessing radio link quality.

In yet another example, only up to S QCL states with lower local IDs are selected per CORESET in each round, where S is a positive integer. If the number of QCL states or DL RSs has not been exceeded, the next round is implemented. In the example shown in FIG. 6, there are three CORESETs and the maximum number of DL RSs to be accessed for radio link quality is 3. In a first round, only one RS is selected from the candidate QCL state with lowest local ID of one CORESET in an order from the lowest CORESET ID, i.e., DL RS-6, DL RS-1 and DL RS-1. Taking into account the one same DL RS has been selected, in the first round, DL RS-6 and DL RS-1 is selected in order. In the second round, only one RS is selected from the rest of QCL state with lowest local ID of one CORESET in an order from the lowest CORESET ID, i.e., DL RS-7 and DL RS-2 is selected in order. Finally, since only 3 DL RSs are to be used for accessing radio quality, DL RS-6, DL RS-1 and DL RS-7 are selected.

In yet another example, lower ID of QCL state within one BWP or cell has higher priority.

Embodiment 4: Beam Determination for DL Data Channel with a Scheduling Offset

In some embodiments, when multiple QCL states (e.g., beam or TCI state) can be configured and/or combined for one CORESET, one or more QCL states of the multiple QCL states are determined as the QCL state for PDSCH with the scheduling offset<threshold.

In some embodiments, the state with a specific ID or primary state of the multiple QCL state is used for PDCCH reception in the CORESET. In an example, the other entries or all entries of the multiple QCL state are used as default QCL assumption for the PDSCH with the scheduling offset<threshold or scheduled by DCI format 0_0. In another example, the other entries or all entries of the multiple QCL states are used for the scheduled PDSCH if TCI is not present in DCI. In yet another example, the state with specific ID can be the state with the lowest ID, the highest ID or a specific ID.

In some embodiments, the QCL states of the CORESET that are used for determining the QCL assumption of PDSCH with the scheduling offset<threshold, should meet at least one of the following rules:

If there is at least one CORESET with configured TCI state with monitored search space set in the latest slot, the corresponding CORESET should be one of configured with the TCI state (with the CORESET with CSS or CORESET #0 being precluded).

If there is at least one CORESET with a common search space to be monitored in the latest slot, the corresponding CORESET should be one of those configured with common search space.

If there is at least one CORESET with a UE specific search space to be monitored in the latest slot, the corresponding CORESET should be one of those configured with UE specific search space.

In some embodiments, the QCL states of the CORESET (the CORESET being one with a monitored search space set in the latest slot) are used for determining the QCL assumption of PDSCH with the scheduling offset<threshold, should be determined based on at least one of the following rules:

CORESET with a TCI state is prioritized over CORESET without a configured TCI state.

CORESET excluding CORESET #0 is prioritized over CORESET #0.

CORESET with a common search space set is prioritized over CORESET with a UE specific search space set.

CORESET with a UE specific search space set is prioritized over CORESET with a common search space set.

Embodiment 5: Beam Determination for UL Data Channel

In some embodiments, multiple spatial relation states (e.g., also called as beams, or quasi-co spatial relation states) can be configured for SPS-PUSCH or PUCCH.

In some embodiments, multiple spatial relation states are associated with a time unit or transmission occasion of the SPS-PUSCH or PUCCH, in an ordered manner.

In some embodiments, the spatial relation(s) or spatial filter(s) of PUSCH transmission scheduled by DCI format 1_0 is determined according to all spatial relation states or all spatial relation states excluding one specific states of PUCCH. In an example, the PUCCH is the PUCCH resource with the lowest or highest resource ID within the bandwidth part (BWP) or cell. In another example, the PUCCH resources are from one PUCCH resource set, which is associated with one CORESET group, time-unit group, transmission occasion group, or DMRS port group. In yet another example, the PUCCH is the PUCCH resource associated with the DCI format 1_0 or associated with one search space or CORESET of the DCI format 1_0. In yet another example, the specific state can be one state with lowest ID, highest ID or specific ID. In yet another example, the DCI format 1_0 is one default DCI format for scheduling PUSCH.

Exemplary Methods for the Disclosed Technology

Embodiments of the disclosed technology advantageously result in ultra-reliable and low latency communications in existing and emerging cellular communication systems.

Figure 7:
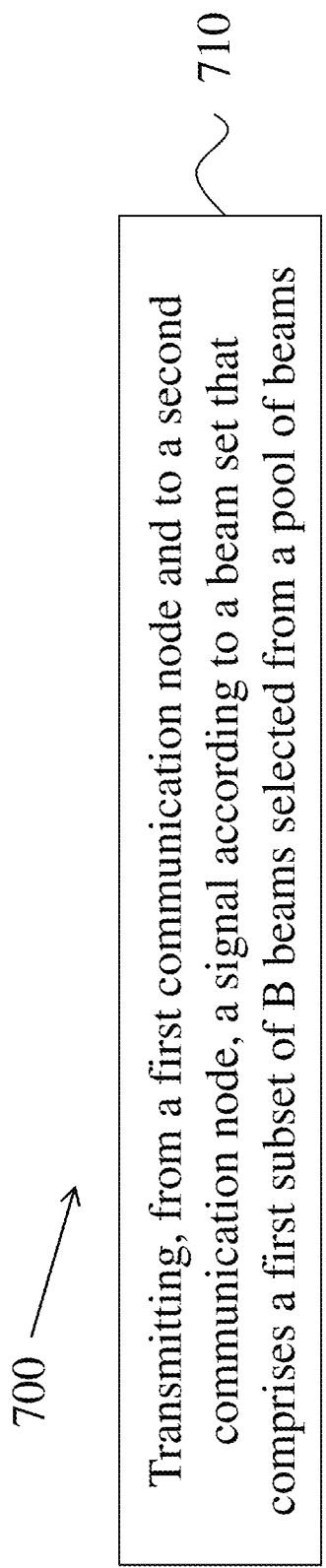
FIG. 7 is a flowchart of an example of a wireless communication method.

FIG. 7 shows an example of a wireless communication method 700 for signaling QCL information. The method 700 includes, at step 710, transmitting, from a first communication node and to a second communication node, a signal according to a beam set that comprises a first subset of B beams selected from a pool of beams, wherein B is positive integer. In some embodiments, a beam of the beam set comprises one or more channel property assumptions, one or more reference signals (RSs), one or more RS sets, one or more spatial relation states, one or more QCL states, one or more TCI states, one or more spatial domain filters or one or more pre-coding filters.

In some embodiments, and in the context of method 700, performing a PUSCH transmission is according to one or more beams of the beam set of a PUCCH resource. In an example, the PUCCH resource comprises a lowest or a highest resource ID within a bandwidth part (BWP) or a cell. In another example, the PUCCH resource is from a PUCCH resource set that is associated with one CORESET group or one resource element group. In yet another example, the PUSCH transmission is scheduled by one DCI format 1_0. In yet another example, the PUCCH resource is associated with the DCI format 1_0 or associated with one search space or CORESET of the DCI format 1_0.

Figure 8:
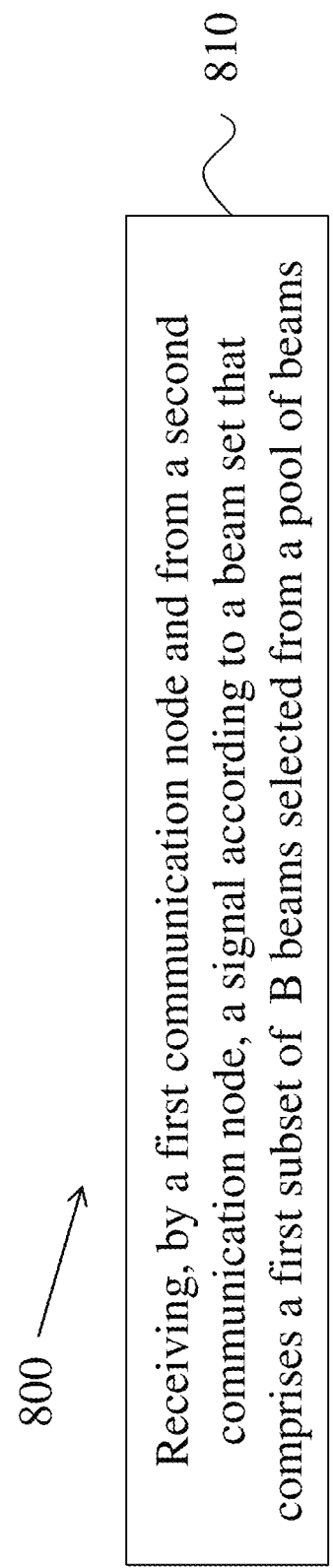
FIG. 8 is a flowchart of another example of a wireless communication method.

FIG. 8 shows an example of another wireless communication method 800 for signaling QCL information. This example includes some features and/or steps that are similar to those shown in FIG. 7, and described above. At least some of these features and/or steps may not be separately described in this section.

The method 800 includes, at step 810, receiving, by a first communication node and from a second communication node, a signal according to a beam set that comprises a first subset of B beams selected from a pool of beams, wherein B is positive integer.

In some embodiments, the methods 700 and 800 may further include the steps of selecting, based on a bitmap, a second subset of beams from the pool of beams, and combining one or more of the second subset of beams to generate the first subset of B beams.

In some embodiments, the methods 700 and 800 may further include the steps of selecting, based on a bitmap, a second subset of beams from the pool of beams, combining the one or more of the second subset of beams and the first subset of B beams to generate the beam set, and determining a QCL assumption of a CSI-RS resource for tracking according to the one or more beams from the second subset of beams.

In some embodiments, the selecting and combining are based on a medium access control (MAC) control element (CE) command. In an example, one or more fields related to the combining are determined based on values of flag fields in the MAC CE command. In an example, one codepoint of a command related to the combining is reserved as blank or not associated with any one beam of the one or more of the second subset of beams.

In some embodiments, the selecting is based on a first medium access control (MAC) control element (CE) command, the combining is based on a second MAC CE command different from the first MAC CE command, and the second MAC CE command is based on the one or more of the second subset of beams selected by the first MAC CE command. In an example, one codepoint of a command related to the combining is reserved as blank or not associated with any one beam of the one or more of the second subset of beams or any one beam of the pool of beams.

In some embodiments, and in the context of methods 700 and 800, each beam of the beam set may be selected from a pool of beams based on an explicit identification of the each beam. In other embodiments, the beam set comprises M beams, one beam of the beam set is associated with E respective resource elements of the signal in order, the signal comprises E×M resource elements, and E and M are positive integers. In yet other embodiments, resource elements of the signal are grouped into S sets that are associated with the beam set, and S and M are positive integers. In an example, one or more beams associated with a j-th set of the S sets are determined according to at least one or more of j, M and S. In another example, the j-th set of the S sets is associated with a floor(j/N×M)-th beam of the beam set, where floor(x) is a function that returns a greatest integer that is less than a real number x. In yet another example, the j-th set of the S sets is associated with a (j % M)-th beam of the beam set, where % is a modulo function.

In some embodiments, the beam set comprises M beams, the beam set is associated with N resource elements of the signal, where M and N are positive integers. In an example, one or more beams associated with a j-th resource element of the N resource elements are determined according to at least one or more of j, M and N. In another example, the j-th resource element of the N resource elements is associated with a floor(j/N×M)-th beam of the beam set, where floor(x) is a function that returns a greatest integer that is less than a real number x. In yet another example, the j-th resource element of the N resource elements is associated with a (j % M)-th beam of the beam set, where % is a modulo function.

In some embodiments, the signal is a control resource set (CORESET), a physical downlink shared channel (PDSCH), a physical downlink control channel (PDCCH), a physical uplink shared channel (PUSCH) or a physical uplink control channel (PUCCH).

In some embodiments, a resource element of the signal is a transmission occasion, a reference signal (RS) port, an RS port group, an RS resource, an RS resource set, a search space, a time unit, or a frequency resource.

In some embodiments, the beam set is determined based on a physical downlink control channel (PDCCH) scheduling the signal, a control resource set (CORESET) scheduling the signal, an index of at least one time unit of the signal, an index of at least one resource element of the signal, or an index of demodulation reference signal (DMRS) port group.

In some embodiments, the method 800 further includes the steps of performing a recovery or monitoring process according to one or more CORESETs, wherein each of the one or more CORESETs is associated with its corresponding beam set. In an example, the method 800 further includes measuring a radio link quality according to one beam of the beam set, wherein the one beam comprises a highest index or the one beam comprises a lowest index or the one beam is a primary entry of the beam set. In another example, the method 800 further includes measuring a radio link quality according to each beam of one or more beam sets of the one or more CORESETs. In yet another example, measuring a radio link quality according to one or more beams of beam sets of the one or more CORESETs and maximum number of beams to be measured, wherein (a) per CORESET, only one beam with a lowest or highest beam ID is selected for determining a radio link quality, wherein the lowest or highest beam ID is a local ID in the associated CORESET or an ID in the pool of beams, (b) one CORESET with a lower or higher CORESET ID has higher priority, or (c) one CORESET with a search space with a shorter periodicity has higher priority.

In some embodiments, and in the context of method 800, performing a PDSCH reception with a scheduling offset less than a threshold is according to at least one beam of one CORESET with a configured TCI state with a monitored search space set in a latest slot. In other embodiments, performing a PDSCH reception with a scheduling offset less than a threshold is according to at least one beam of one CORESET configured with a common search space to be monitored in a latest slot. In yet other embodiments, performing a PDSCH reception with a scheduling offset less than a threshold is according to at least one beam of one CORESET configured with a UE specific search space to be monitored in a latest slot. In yet other embodiments, performing a PDSCH reception with a scheduling offset less than a threshold is according to at least one beam of one CORESET, and wherein the performing is determined based on at least one of the following rules: (i) a CORESET with a TCI state is prioritized over another CORESET without a configured TCI state, (ii) a CORESET excluding CORESET #0 is prioritized over CORESET #0, (iii) a CORESET with a common search space set is prioritized over another CORESET with a UE specific search space, or (iv) a CORESET with a UE specific search space set is prioritized over another CORESET with a common search space.

In some embodiments, the pool of beams is configured using radio resource control (RRC) messages. In other embodiments, the pool of beams is based on one or more resource signal (RS) resources or RS resource sets. For example, the one or more RS resource sets comprises a sounding reference signal (SRS) resource set.

Implementations for the Disclosed Technology

Figure 9:
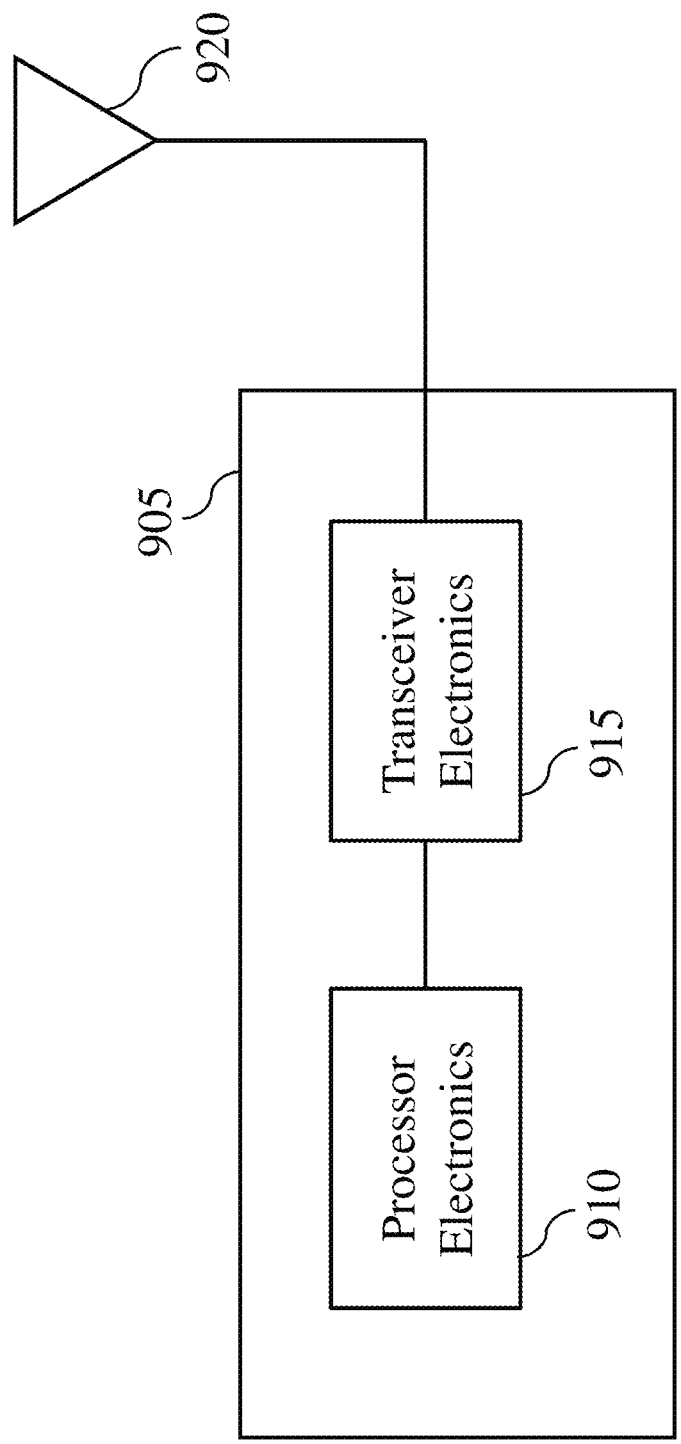
FIG. 9 is a block diagram representation of a portion of an apparatus, in accordance with some embodiments of the presently disclosed technology.

FIG. 9 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   receiving, by a first communication node and from a second communication node, a signal according to a beam set,
   wherein the beam set comprises a first subset of B beams, B being a positive integer,
   wherein each of the first subset is from a pool of beams,
   wherein the beam set comprises M beams, M being a positive integer, wherein resource elements of the signal are grouped into S sets that are associated with the beam set, S being a positive integer, wherein one beam associated with a j-th set of the S sets is determined according to at least one or more of j, M and S, and wherein the j-th set of the S sets is associated with a (j % M)-th beam of the beam set, and wherein % is a modulo function.

2. The method of claim 1, wherein a beam of the beam set comprises one or more spatial relation states that include one or more quasi-co-location (QCL) states or one or more transmission configuration indicator (TCI) states.

3. The method of claim 1, wherein one beam of the beam set is associated with E respective resource elements of the signal in order, wherein the signal comprises E×M resource elements, and wherein E and M are positive integers.

4. The method of claim 1, wherein the beam set comprises M beams, wherein the beam set is associated with N resource elements of the signal, and wherein M and N are positive integers.

5. The method of claim 4, wherein one beam associated with a j-th resource element of the N resource elements is determined according to at least one or more of j, M and N.

6. The method of claim 4, wherein the j-th resource element of the N resource elements is associated with a (j % M)-th beam of the beam set, and wherein % is a modulo function.

7. The method of claim 1, wherein the signal is a physical downlink shared channel (PDSCH).

8. The method of claim 1, wherein a resource element of the signal is a transmission occasion.

9. A method for wireless communication, comprising:
transmitting, from a first communication node and to a second communication node, a signal according to a beam set, wherein the beam set comprises a first subset of B beams, B being a positive integer, wherein each of the first subset is selected from a pool of beams, B is positive integer, wherein the beam set comprises M beams, M being a positive integer, wherein resource elements of the signal are grouped into S sets that are associated with the beam set, S being a positive integer, wherein one beam associated with a j-th set of the S sets is determined according to at least one or more of j, M and S, and wherein the j-th set of the S sets is associated with a (j % M)-th beam of the beam set, and wherein % is a modulo function.

10. The method of claim 9, wherein a beam of the beam set comprises one or more spatial relation states that include one or more quasi-co-location (QCL) states or one or more transmission configuration indicator (TCI) states.

11. The method of claim 9, wherein one beam of the beam set is associated with E respective resource elements of the signal in order, wherein the signal comprises E×M resource elements, and wherein E and M are positive integers.

12. The method of claim 9, wherein the beam set comprises M beams, wherein the beam set is associated with N resource elements of the signal, and wherein M and N are positive integers.

13. The method of claim 12, wherein one beam associated with a j-th resource element of the N resource elements is determined according to at least one or more of j, M and N.

14. The method of claim 12, wherein the j-th resource element of the N resource elements is associated with a (j % M)-th beam of the beam set, and wherein % is a modulo function.

15. The method of claim 9, wherein the signal is a physical downlink shared channel (PDSCH).

16. A communication device comprising a processor and a memory, wherein the processor is configured to:
receive a signal according to a beam set, wherein the beam set comprises a first subset of B beams, B being a positive integer, wherein each of the first subset is from a pool of beams, wherein the beam set comprises M beams, M being a positive integer, wherein resource elements of the signal are grouped into S sets that are associated with the beam set, S being a positive integer, wherein one beam associated with a j-th set of the S sets is determined according to at least one or more of j, M and S, and wherein the j-th set of the S sets is associated with a (j % M)-th beam of the beam set, and wherein % is a modulo function.

17. The communication device of claim 16, wherein a beam of the beam set comprises one or more spatial relation states that include one or more quasi-co-location (QCL) states or one or more transmission configuration indicator (TCI) states.

18. The communication device of claim 16, wherein one beam of the beam set is associated with E respective resource elements of the signal in order, wherein the signal comprises E×M resource elements, and wherein E and M are positive integers.

19. The communication device of claim 16, wherein the beam set comprises M beams, wherein the beam set is associated with N resource elements of the signal, and wherein M and N are positive integers.

20. The communication device of claim 16, wherein the signal is a physical downlink shared channel (PDSCH).

21. A communication device comprising a processor and a memory, wherein the processor is configured to:
transmit a signal according to a beam set, wherein the beam set comprises a first subset of B beams, B being a positive integer, wherein each of the first subset is from a pool of beams, wherein the beam set comprises M beams, M being a positive integer, wherein resource elements of the signal are grouped into S sets that are associated with the beam set, S being a positive integer, wherein one beam associated with a j-th set of the S sets is determined according to at least one or more of j, M and S, and wherein the j-th set of the S sets is associated with a (j % M)-th beam of the beam set, and wherein % is a modulo function.

22. The communication device of claim 21, wherein a beam of the beam set comprises one or more spatial relation states that include one or more quasi-co-location (QCL) states or one or more transmission configuration indicator (TCI) states.

23. The communication device of claim 21, wherein one beam of the beam set is associated with E respective resource elements of the signal in order, wherein the signal comprises E×M resource elements, and wherein E and M are positive integers.

24. The communication device of claim 21, wherein the beam set comprises M beams, wherein the beam set is associated with N resource elements of the signal, and wherein M and N are positive integers.

25. The communication device of claim 21, wherein the signal is a physical downlink shared channel (PDSCH).

\* \* \* \* \*